US008311212B2

(12) United States Patent
Giraud et al.

(10) Patent No.: US 8,311,212 B2
(45) Date of Patent: Nov. 13, 2012

(54) METHOD OF PROCESSING DATA PROTECTED AGAINST ATTACKS BY GENERATING ERRORS AND ASSOCIATED DEVICE

(75) Inventors: Christophe Giraud, Pessac (FR); Hugues Thiebeauld de la Crouee, Pessac (FR)

(73) Assignee: Oberthur Technologies, Levallois-Perret (FR)

( * ) Notice: Subject to any disclaimer, the term of this patent is extended or adjusted under 35 U.S.C. 154(b) by 1048 days.

(21) Appl. No.: 12/184,546

(22) Filed: Aug. 1, 2008

(65) Prior Publication Data
US 2009/0034717 A1 Feb. 5, 2009

(30) Foreign Application Priority Data
Aug. 3, 2007 (FR) ...................................... 07 56943

(51) Int. Cl.
*H04L 9/00* (2006.01)
*G06F 11/30* (2006.01)
*G06F 12/14* (2006.01)

(52) U.S. Cl. ........... 380/28; 380/269; 713/187; 713/188
(58) Field of Classification Search .................. 380/28, 380/269; 713/187–188
See application file for complete search history.

(56) References Cited

U.S. PATENT DOCUMENTS

| | | | |
|---|---|---|---|
| 6,289,455 B1 * | 9/2001 | Kocher et al. ................. | 713/194 |
| 6,643,815 B1 * | 11/2003 | Davis et al. .................... | 714/758 |
| 7,394,410 B1 * | 7/2008 | Wegener ......................... | 341/61 |
| 7,509,292 B2 * | 3/2009 | Walmsley ........................ | 705/64 |
| 7,907,722 B2 * | 3/2011 | Timmermans ................... | 380/28 |
| 2002/0099948 A1 * | 7/2002 | Kocher et al. .................. | 713/194 |
| 2003/0044004 A1 * | 3/2003 | Blakley et al. .................. | 380/28 |
| 2004/0125950 A1 * | 7/2004 | Yen et al. ......................... | 380/30 |
| 2004/0215685 A1 * | 10/2004 | Seifert et al. ................... | 708/492 |
| 2006/0029224 A1 * | 2/2006 | Baek et al. ....................... | 380/30 |
| 2007/0019805 A1 | 1/2007 | Karpovsky et al. | |
| 2007/0177720 A1 | 8/2007 | Bevan et al. | |
| 2009/0240756 A1 | 9/2009 | Boscher et al. | |
| 2009/0327751 A1 * | 12/2009 | Koifman et al. .............. | 713/189 |

FOREIGN PATENT DOCUMENTS

| | | |
|---|---|---|
| WO | WO 98/52319 | 11/1998 |
| WO | WO 03/069841 | 8/2003 |
| WO | WO 2004/006074 | 1/2004 |
| WO | WO 2005/088895 | 9/2005 |
| WO | 2006103341 A1 | 10/2006 |

OTHER PUBLICATIONS

Konrad J. Kulikowski et al., Robust Codes and Robust, Fault-Tolerant architectures of Advanced Encryption Standard, Journal of Systems Architecture, Elsevier science Publishers BV, Jan. 20, 2007, vol. 53, No. 2-3, pp. 139-149.

(Continued)

*Primary Examiner* — Catherine Thiaw
(74) *Attorney, Agent, or Firm* — Young & Thompson (57) ABSTRACT

A data processing method comprises the following steps:
  determining a first result data word from a first input data word and a first secret data word;
  obtaining a first compressed data word from the first result data word or the first input data word using a compression algorithm;
  determining a second result data word from a second input data word and a second secret data word;
  obtaining a second compressed data word from the second result data word using the compression algorithm;
  comparing the first compressed data word and the second compressed data word.

21 Claims, 6 Drawing Sheets

OTHER PUBLICATIONS

Giraud, "An RSA Implementation Resistant to Fault Attacks and to Simple Power Analysis", IEEE Trans. on Comp., vol. 55, No. 9, pp. 1116-1120 (Sep. 2006).

Wagner, "Cryptanalysis of a Provably Secure CRT-RSA Algorithm", in B. Pfitzmann and P. Liu, editors, ACM Conference on Computer and Communications Security—CCS'04, pp. 82-91, ACM Press, 2004.

Novak, "SPA-Based Adaptive Chosen-Ciphertext Attack on RSA Implementation", Jozef Stefan Institute, Jamova 39, 1000 Ljubljana, Slovenia. pp. 252-262, 2002.

* cited by examiner

METHOD OF PROCESSING DATA PROTECTED AGAINST ATTACKS BY GENERATING ERRORS AND ASSOCIATED DEVICE

BACKGROUND OF THE INVENTION

1. Field of the Invention

The invention concerns a method for processing data, in particular for cryptographic processing of data, protected against attacks by generation of errors, and an associated device.

2. Description of the Related Arts

In some data processing methods, in particular in the context of cryptographic processing of data, processing algorithms use data that must remain secret (for example cryptographic keys) to ensure that the system functions with the required security.

This type of method is the target of attacks by malicious persons seeking to circumvent the security of the system.

These attacks include attacks by generating errors that disrupt the normal execution of the data processing method (generally implemented by executing a program in a microprocessor) in order to obtain on exit from the method data different from that normally expected but revealing information on secret data used in the algorithm (in contrast to what happens in the event of execution of the program without errors). To combat this type of attack complementary steps have been added (for example reiteration of calculations already effected) to verify execution without error of the data processing method, for example as described in patent applications WO 2005/088895 and WO 2006/103341.

In this type of solution, data must be stored during the supplementary operations the result of which provides for verification by comparison with the stored data; it is generally a question of storing the data obtained by the first iteration of the cryptographic calculation during the second iteration of the same calculation.

This storage can prove problematic, however, especially in the case of microcircuit cards having a fast access rewritable memory space (for example random access memory (RAM), also known as volatile memory) of limited capacity (typically only a few thousand bits, whereas constraints relating to security encourage the use of ever longer data word, in particular secret keys, typically 1024 or 2048 bits long).

SUMMARY OF THE INVENTION

In this context, the invention proposes a data processing method comprising the steps of:
  determining a first result data word from a first input data word and a first secret data word (for example using a first algorithm—generally a cryptography algorithm—using the first secret data word);
  obtaining a first compressed data word from the first result data word or the first input data word using a compression algorithm;
  determining a second result data word from a second input data word and a second secret data word (for example using a second algorithm—generally a cryptography algorithm—using the second secret data word);
  obtaining a second compressed data word from the second result data word using the compression algorithm;
  comparing the first compressed data word and the second compressed data word.

Thus comparison enables verification of correct execution of the processes of determining (generally calculating) result data words with the aim of detecting attacks by generation of errors, with limited memory resources.

In a first embodiment, the second input data word is the first input data word, the second secret data word is the first secret data word, and the first compressed data word is obtained by compressing the first result data word. This is in the context of verification by reiteration of a process using as input the first input data word and as secret data word (for example cryptographic key) the first secret data word.

In a second embodiment, the second input data word is the first result data word and the first compressed data word is obtained by compressing the first input data word. In this case correct execution of the process of determining the first data word is verified by applying to the first result data word (second input data word in this case) an inverse process and in this case the aim is therefore to compare the first input data word and the second result data words which should be equal in normal operation.

In other embodiments, for example in the context of the RSA scheme implemented by means of the Chinese remainder theorem, for example, as described hereinafter the first result data word is for example obtained at least on the basis of a verification data word linked to a data word representing a modular exponentiation result, and the first compressed data word is obtained by compressing the first result data word, for example.

In this context, during modular exponentiation, a particular operation is selectively applied to the verification data word or to the data word representing the result according to the value of a bit of the first secret data word, which obtains a verification data word linked to the result of the modular exponentiation in a manner that is particularly practical.

Still in the context of the RSA scheme, the second result data word can be obtained by means of a calculation including recombination of partial modular results.

In practice, the first secret data word and the second secret data word are generally each at least obtained from at least one cryptographic key. This can be the cryptographic key itself or a modular remainder of that key, for example.

For example, the compression algorithm uses a function that cannot be inverted, which is beneficial in terms of compression rate and calculation speed. In practice the compression algorithm can be of the CRC type. This algorithm comprises, for example, a summation of words of a predetermined number of bits modulo the number two to the power of that number. Alternatively, the compression algorithm can comprise the application of an exclusive-OR operation to words of a predetermined number of bits.

For the practical implementation of the method, there is generally provided a step of storing (for example in random access memory) the first data word compressed before the step of obtaining the second result data word and/or a step of storing (for example a random access memory) the second data word compressed before the comparison step.

Alternatively, the first compressed data word (and where applicable the second compressed data word) can be stored in an internal register of a microprocessor implementing the method.

The invention also proposes a data processing device, characterized in that it comprises means for determining a first result data word from a first input data word and a first secret data word, means for obtaining a first compressed data word from the first result data word or the first input data word using a compression algorithm, means for determining a second result data word from a second input data word and a second secret data word, means for obtaining a second compressed data word from the second result data word using the compression algorithm, and means for comparing the first compressed data word and the second compressed data word. The device can be a pocket electronic entity, such a microcircuit card, for example conforming to the ISO standard 7816; alternatively, it can be some other type of electronic entity, for example a computer (such as a personal computer) or a USB key.

Such devices can where appropriate further comprise some of the optional features referred to hereinabove in respect of the method.

The methods referred to above are typically implemented by execution of instructions of a computer program by a processor. Executing the instructions causes the microprocessor to process data stored in the device, for example in a random access memory of the device. Other embodiments can nevertheless be envisaged, for example using an application-specific integrated circuit to execute the steps of the methods referred to above.

In these various contexts, the input data can be data received by the processing device from an external device, for example by means of a communication interface of the processing device. It can nevertheless equally consist of data stored in the device (for example in non-volatile memory) or intermediate data obtained from data of the type described above.

Similarly, at least one of the result data words can be a data word to be sent to the output of the device, for example to be sent to the exterior device via the communication interface. The result data can nevertheless be merely intermediate data, where appropriate used by the device in subsequent processes (for example calculation processes).

Each of the cryptographic algorithms referred to above can execute at least part of an encryption, decryption, signature, cryptographic key exchange or cryptographic key generation operation, for example. In this type of application, the input data (in particular the first input data word) is for example a message (or a portion of a message) received from the exterior device and that is encrypted (or decrypted) in the processing device using the aforementioned cryptography algorithm(s) and then sent back to the output of the processing device via the communication interface.

In a different application, the algorithm(s) sign the message and the processing device therefore sends to the output the signature calculated from the input data word.

Alternatively, the result obtained by means of at least one of the cryptography algorithms is not sent to the output by the device but can condition subsequent sending by the device of other data.

BRIEF DESCRIPTION OF THE DRAWING FIGURES

Other features and advantages of the invention will become more apparent in the light of the following description, given with reference to the appended drawings, in which.

DETAILED DESCRIPTION OF THE INVENTION

Figure 1:
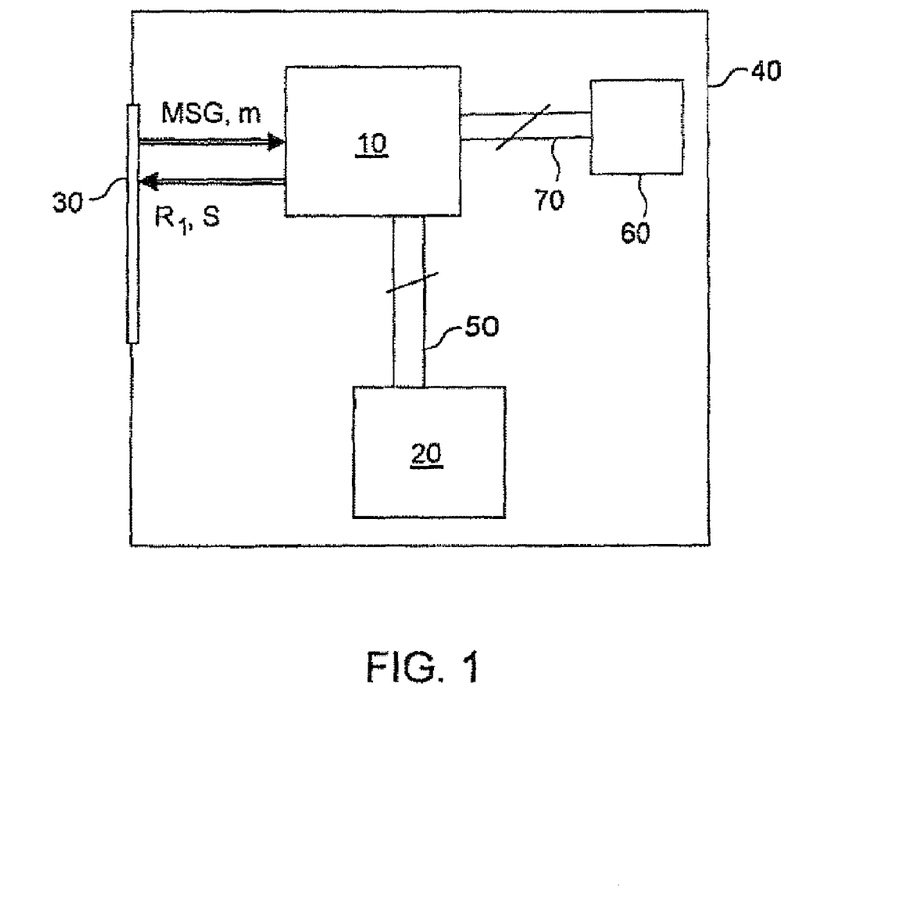
FIG. 1 represents a data processing device implementing the present invention.

FIG. 1 represents diagrammatically a data processing device 40 in which the present invention is implemented. This device 40 comprises a microprocessor 10 with which are associated, on the one hand, a random access memory 60, for example by means of a bus 70, and, on the other hand, a non-volatile memory 20 (for example of the EEPROM type), for example via a bus 50.

The data processing device 40, and to be more specific the microprocessor 10 that it incorporates, can exchange data with exterior devices via a communication interface 30.

FIG. 1 represents diagrammatically the transmission of an input data word, hereinafter denoted MSG or m, received from an exterior device (not shown) and transmitted from the communication interface 30 to the microprocessor 10. There is similarly represented the transmission of an output data word, denoted $R_1$ or S hereinafter, from the microprocessor 10 to an exterior device via the communication interface 30. Although, for illustration purposes, the input data and the output data are shown on different arrows, the physical means enabling communication between the microprocessor 10 and the interface 30 could be provided by a single entity, for example a serial communication port or a bus.

The microprocessor 10 is adapted to execute software (i.e. a computer program) enabling the data processing device 40 to execute a method of the invention examples whereof are given hereinafter. The software consists of a series of command instructions for the microprocessor 10 that are stored in the memory 20, for example.

Alternatively, the combination of the microprocessor 10, the non-volatile memory 20, and the random access memory 60 can be replaced by an application-specific integrated circuit that comprises means for executing the various steps of the data processing method.

Figure 2:
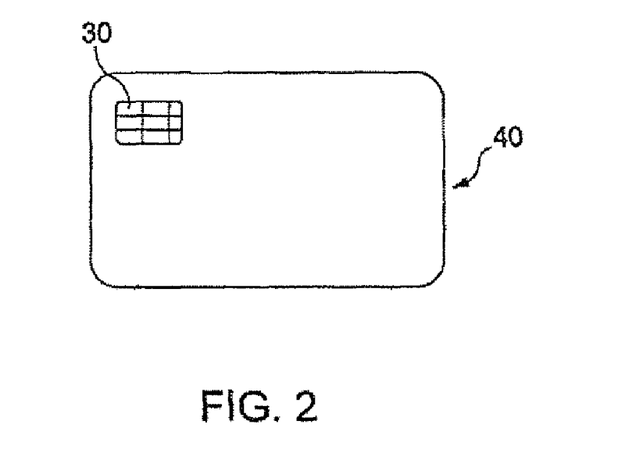
FIG. 2 represents a microcircuit card as an example of the FIG. 1 processing device.

FIG. 2 represents a microcircuit card that constitutes an example of a data processing device of the invention as represented in FIG. 1. In this case the communication interface 30 is provided by the contacts of the microcircuit card, which incorporates a microprocessor 10, a random access memory 60 and a non volatile memory 20, as shown in FIG. 1.

This microcircuit card conforms to the ISO standard 7816, for example, and is provided with a secure microcontroller that combines the microprocessor (or CPU) 20 and the random access memory 60.

Alternatively, the data processing device can be a USB key, a document or a paper information medium incorporating in one of its sheets a microcircuit associated with contactless communication means. It is preferably a portable or pocket electronic entity.

Figure 3:
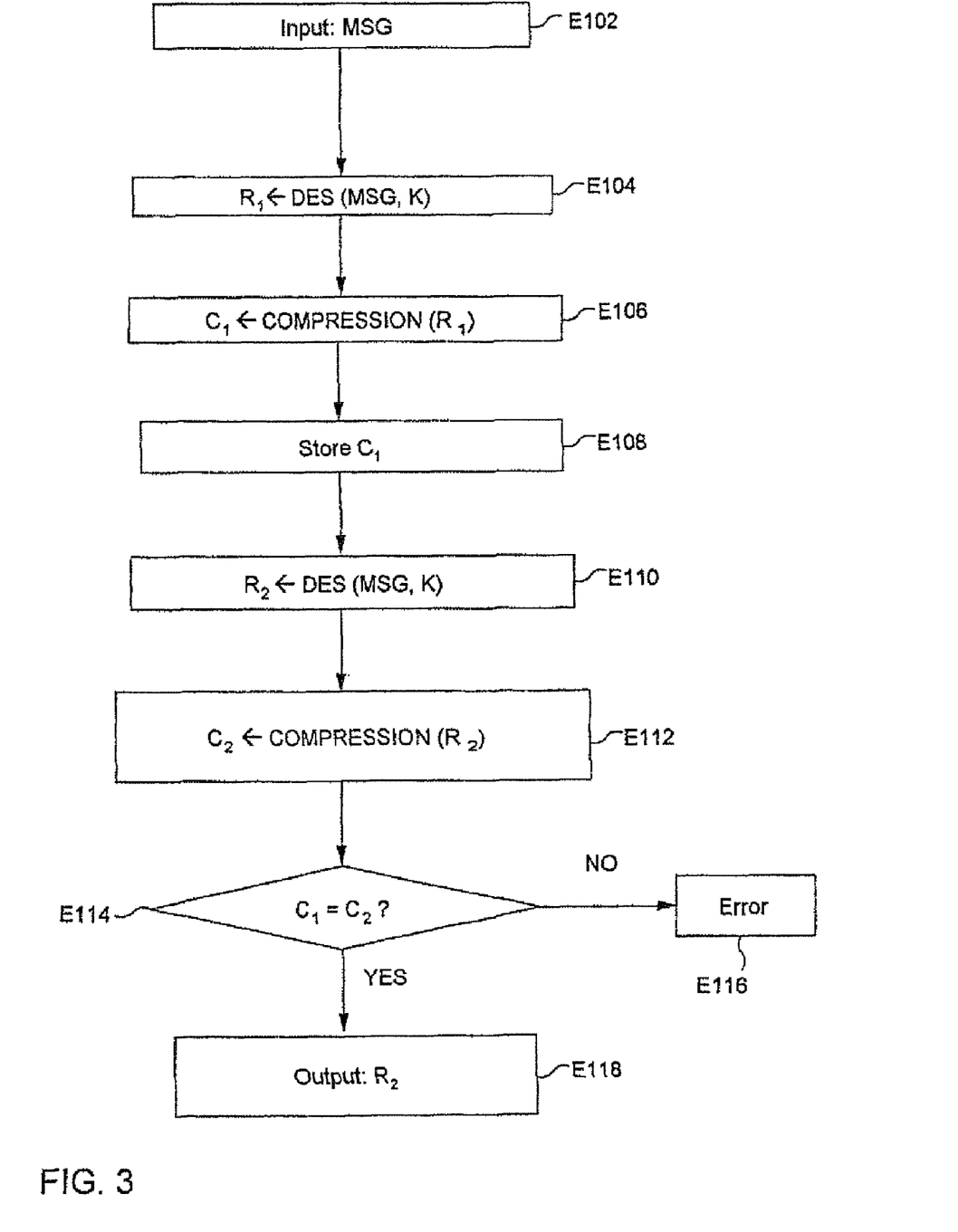
FIG. 3 represents a first example of a data processing method conforming to the teachings of the invention.

FIG. 3 represents the main steps of a use of the invention in the context of the DES cryptography algorithm.

This method begins in the step E102 with the reception by the microprocessor 10 of the message MSG to which the DES algorithm is to be applied (for example via the interface 30, as described above).

This message is formed of a certain number of bits (64 bits here, for example) and on reception is stored in the random access memory 60.

The microprocessor 10 then proceeds in the step E104 to a first application of the DES algorithm to the message MSG using a cryptography key K stored in the non-volatile memory 20.

The cryptography key K is therefore by its nature a secret data word (here also 64 bits long) that hackers will seek to obtain, in particular by attempting to cause operating errors of the data processing device 40 in order to disrupt the calculations performed within the DES algorithm.

The step E104 therefore entails reading the cryptography key K in the non-volatile memory 20 and storing it in the random access memory 60 in which is stored data useful for execution by the microprocessor 10 of the calculations necessary to execute the DES algorithm.

The result $R_1$ of applying the DES cryptography algorithm to the message MSG using the cryptography key K is also stored in the random access memory 60 on exit from the step E104.

Note on this subject that to execute a new iteration of the DES algorithm with the aim of verifying correct execution thereof (see step E110 hereinafter), the message MSG received as input is still stored in the random access memory 60 on exit from the step E104.

There follows the step E106 in which a compression algorithm is applied to the result $R_1$ of the step E104 to obtain a first compressed data word $C_1$. A cyclic redundancy check (CRC) algorithm is used for this purpose, as generally used to obtain a checksum and producing a data word $C_1$ shorter (for example 16 bits) than the data word to be compressed (here the result $R_1$), which has a length of 64 bits in the present example.

One example of a CRC compression algorithm that can be used in this context is a simple summation modulo $2^{32}$ of the various 32-bit words that constitute the value to be compressed. An exclusive-OR (XOR) operation can instead be applied to the 32-bit words that constitute the value to be compressed. Note that these compression algorithms cannot be inverted, i.e. it is not possible to find the initial value from the compressed value. This type of algorithm is particularly efficient in terms of compression rate and execution speed.

Other compression algorithms can naturally be used as well, for example a one-way function (i.e. one whose inverse is difficult to calculate or in practice cannot be calculated), for example of SHA-1 or MD5 type, or a function that can be inverted (for example the Huffman compression algorithm), although their efficacy is limited, in particular when applied to cryptographic or encrypted values the bits of which by definition have a random organization.

There follows the storage in the random access memory 60 of the compressed data word $C_1$ (step 108), freeing up the memory space previously used to store the result $R_1$ of the step E104.

The memory space freed up in this way can then be used for a new iteration of application of the DES algorithm to the message MSG using the cryptography key K in the step E110. This new application of the DES algorithm produces a value $R_2$ (which is equal to the result $R_1$ of the step E104 if both these steps have been executed without errors).

If a cryptoprocessor is used to implement the DES algorithm, the random access memory 60 is not used for the calculations that this algorithm involves, but the freeing up of memory space referred to above provides for at least partial storage of the result of the algorithm without necessitating any corresponding additional memory space.

There follows the step E112 of compressing the result $R_2$ of the step E110 using the same compression algorithm as the step E106 to obtain a second compressed data word $C_2$, which is then compared with the first compressed data word $C_1$ in the step E114.

Depending on the architecture of the data processing device, this comparison may or may not necessitate storage of the second compressed data word $C_2$ in the random access memory 60: in the former case, when it is necessary to store the compressed data word in the random access memory 60, it is stored on exit from the step E112, and the comparison step E114 necessitates reading the first and second compressed data words $C_1$, $C_2$ in the same random access memory (or successively of parts between them); in the latter case, when storage of the second compressed data word in the random access memory 60 is not necessary, the microprocessor 10 for example holds the second compressed data word $C_2$ in an internal register after the step E112 and reads the first compressed data word $C_1$ from the random access memory 60 into another internal register in order to compare the two data words.

If the two DES algorithms have been executed without error, their respective results $R_1$, $R_2$ are identical, so that after application of the same compression algorithm the first compressed data word $C_1$ is equal to the second compressed data word $C_2$. This is why, if the result of comparing the two compressed data words in the step E114 is positive, it is considered that no error has been detected so that, there being no attack, the result $R_2$ stored in the random access memory 60 can be sent to the output. This output data word $R_2$ is sent via the communication interface 30, for example.

On the other hand, if the first compressed data word $C_1$ and the second compressed data word $C_2$ do not prove to be equal, this necessarily means (given the identical nature of the compression algorithms applied in the steps E106 and E112) that the two applications of the DES algorithm have yielded different results and it is then assumed that an error has been detected and that the result of the DES algorithm must not be sent to the output (on the one hand because it is probably erroneous and on the other hand because this would entail the risk of a hacker obtaining information on the secret key K); the next step is therefore the step E116 in which an error message is sent via the interface 30, for example.

Figure 4:
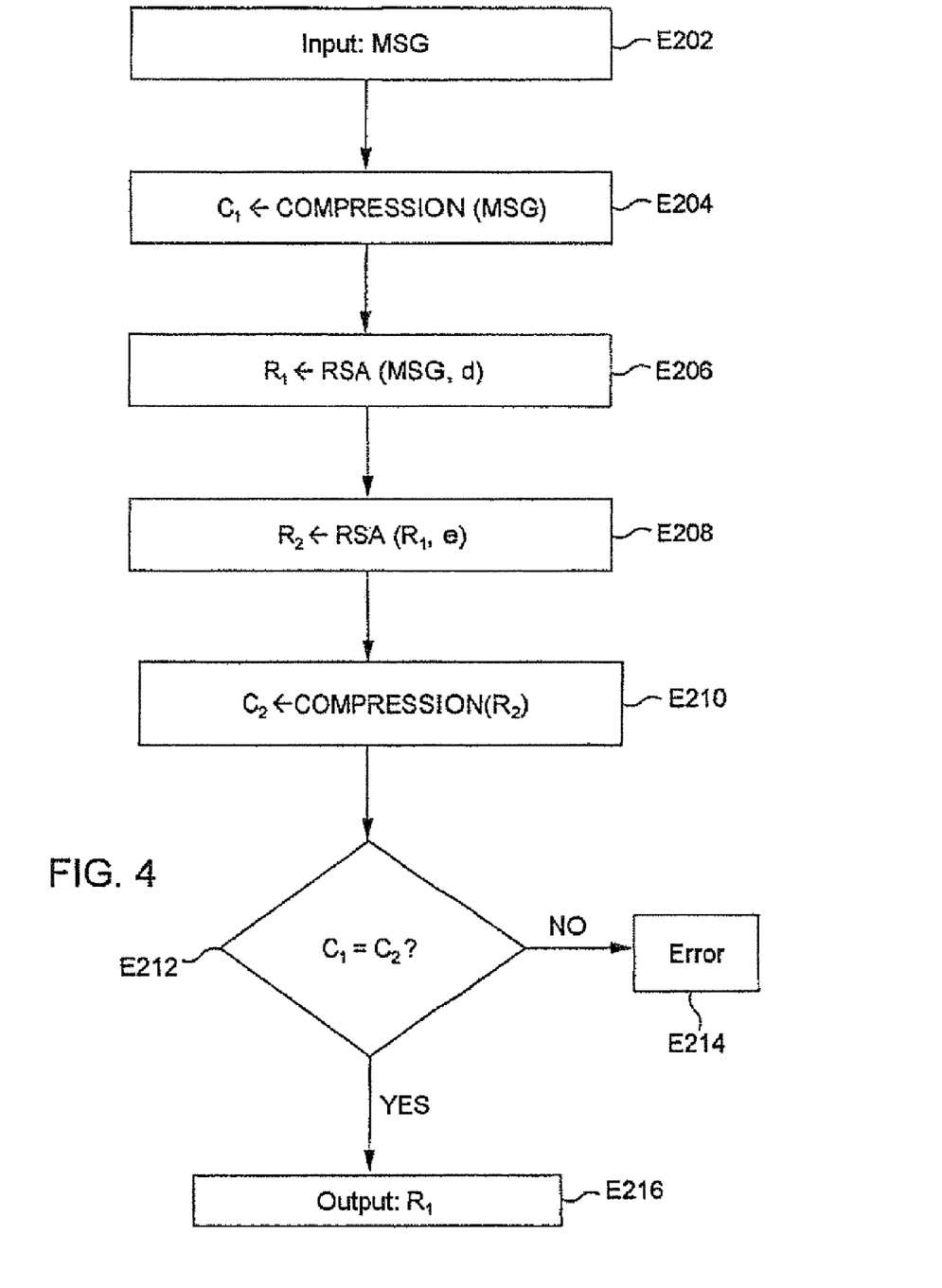
FIG. 4 represents a second embodiment of the data processing method proposed by the invention.

FIG. 4 represents the main steps of implementing the invention in the context of the RSA algorithm.

The situation here is one in which a private (and therefore secret) key d and the associated public key e according to the RSA scheme are stored in the nonvolatile memory 20. Applying the RSA algorithm to the message MSG using the private key d signs the message electronically, for example.

The process begins in the step E202 with the reception of a message MSG to which the RSA algorithm is to be applied.

The message MSG received by the microprocessor 10 via the communication interface 30 is stored in random access memory 60 so that it can be processed.

Then, in the step E204, a compression algorithm (for example of the type described with reference to the first embodiment described above) is then applied and a first compressed data word $C_1$ is therefore obtained, which is stored in the random access memory 60.

Storing this first compressed data word $C_1$ retains a record of the content of the received MSG message, at lower memory cost (although it is naturally not possible with the compression algorithms proposed here to retrieve the message MSG from the compressed data word $C_1$).

Note that after the step E204 the message MSG received at the input is still stored in the random access memory 60.

There can therefore follow in the step E206 the application of the RSA algorithm to the message MSG using a secret key d read in the nonvolatile memory 20, which produces the result $R_1$ of applying the RSA algorithm to the received message.

This result $R_1$ is stored in the random access memory 60. The memory space previously used to store the received message MSG can then be freed up.

There can then follow in the step E208, using the memory space freed up, application of the RSA algorithm to the result $R_1$ of the step E206 using the public key e (read in the nonvolatile memory 20), yielding the result $R_2$.

Given the properties of the RSA algorithm, if the two successive applications of the RSA algorithm in the steps E206 and E208 have proceeded without error, the result $R_2$ should be identical to the message MSG initially received.

Because of this, there follows in the step E210 the compression of the result $R_2$ by means of the compression algorithm used in the step E204 to obtain a second compressed data word $C_2$ (which should in normal circumstances be equal to the first compressed data word $C_1$), and there follows in the step E212 comparison of the first compressed data word $C_1$ and the second compressed data word $C_2$.

Note that in some architectures the result $R_2$ of the second application of the RSA algorithm in the step E208 could be stored in internal registers of the microprocessor 10 and the second compressed data word $C_2$ obtained by calculation in that same register (possibly overwriting the value $R_2$), in which case the comparison performed in the step E212 might not necessitate storing either the result $R_2$ or the second compressed data word $C_2$ in the random access memory 60.

Alternatively, the result $R_2$ and the second compressed data word $C_2$ can be stored in the random access memory 60 in order to effect the necessary calculations and the comparison carried out in the step E212.

In an interesting variant, complementary calculations (for example other cryptography calculations) or operations of reading or writing volatile or nonvolatile memory can be effected between the steps E210 and E212, in order to limit the risk of attack by causing errors on the step E212 seeking to circumvent the countermeasure provided by that step. The benefit of compression is increased in this case where the complementary calculations are greedy of random access memory.

If the result of the comparison in the step E212 is positive, the result $R_2$ of the step E208 is considered to be identical to the message MSG received at the input and it is considered that the RSA algorithms (in particular the first RSA algorithm of the step E206) have proceeded without errors. The result $R_1$ of applying the RSA algorithm to the message MSG using the secret key d can therefore in this case be sent out in the step E216, for example via the communication interface 30.

On the other hand, if the result of the comparison in the step E112 is negative, an error has necessarily occurred in one of the RSA algorithms and, for fear of an attack by generating errors, the result of the RSA algorithm is not sent to the output, but instead an error message is sent to the exterior device, for example (step E214). Instead of this (or possibly in combination with sending the error message), the microprocessor 10 can in this case be disabled in order to prevent any subsequent operation of the device.

Figure 5:
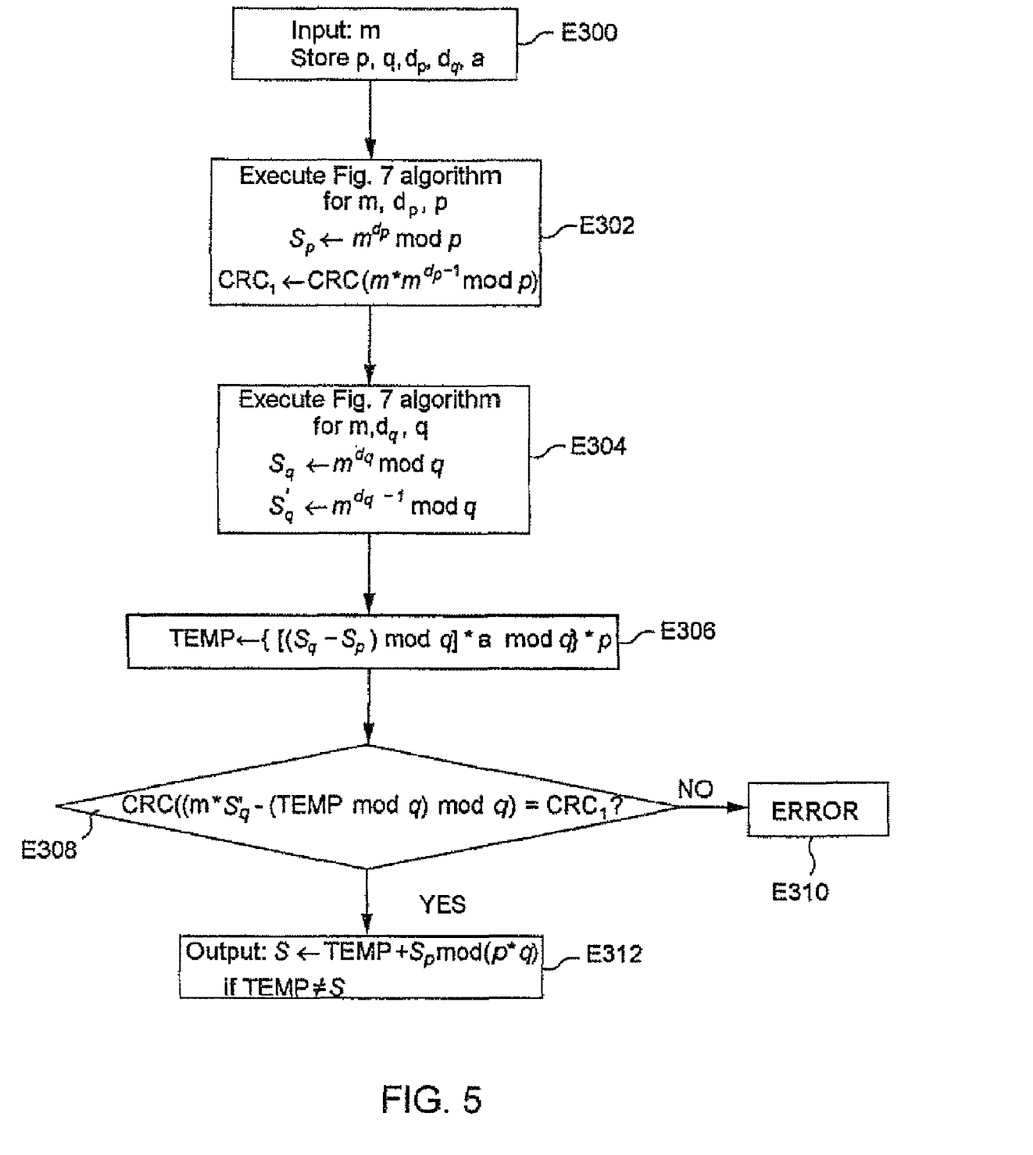
FIG. 5 represents a third embodiment of such a method.

FIG. 5 represents a third embodiment of the invention, again in the context of the RSA algorithm, but this time in a use of that algorithm employing the Chinese remainder theorem (CRT).

To implement this solution, the processing device stores in the nonvolatile memory 20 the moduli p and q of the private key (d, p, q) of the RSA encryption scheme and the remainders $d_p$ and $d_q$ of the secret key d respectively modulo p and modulo q.

In this context $p \cdot q = n$, where n is the public modulus of the encryption scheme, $d_p = d \bmod (p-1)$, and $d_q = d \bmod (q-1)$.

The nonvolatile memory 20 also stores the modular inverse a of p modulo q which therefore satisfies the condition $p \cdot a = 1 \bmod q$. The modular inverse is sometimes denoted $A_{pq}$.

The FIG. 5 method seeks to apply the RSA algorithm by means of the secret key d to a message m received at the input in the step E300, in other words to calculate the value $m^d \bmod n$.

If the Chinese remainder theorem is used, partial modular exponential calculations are carried out, on the one hand modulo p (step E302) and on the other hand modulo q (step E304).

Figure 7:
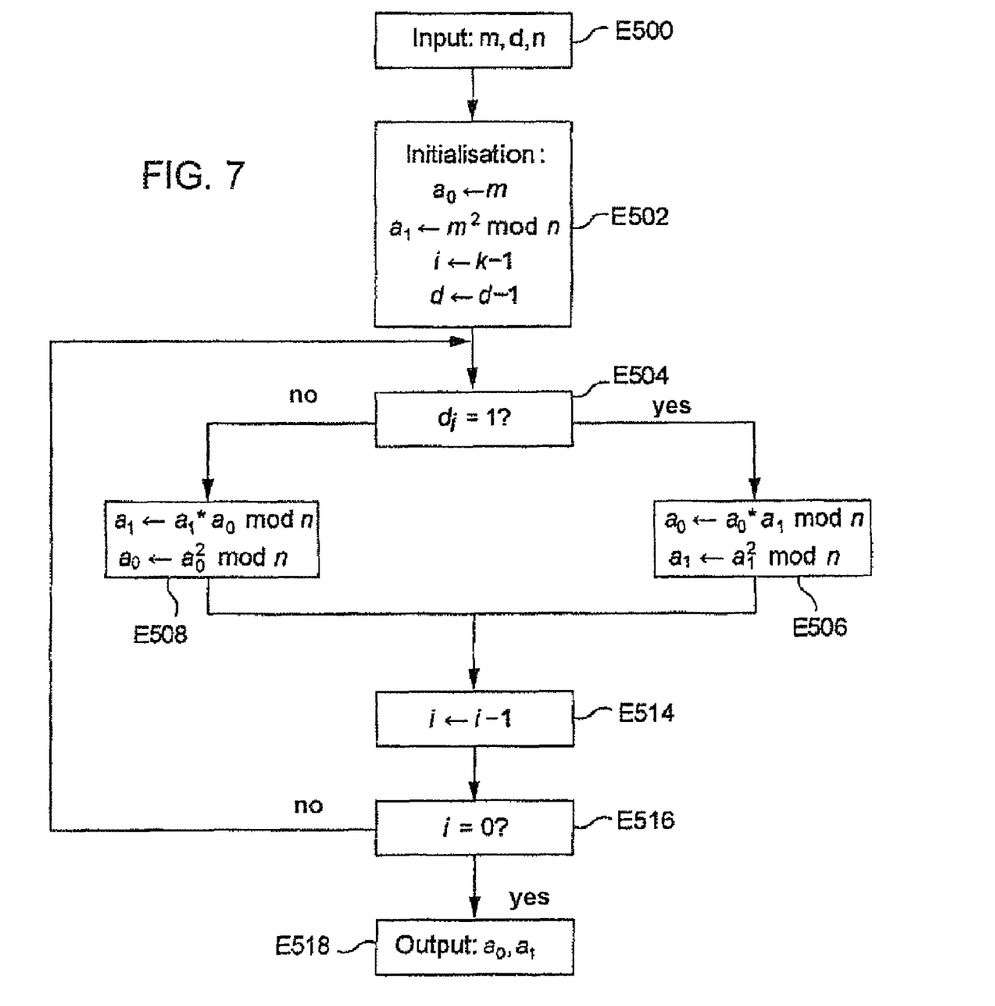
FIG. 7 represents an embodiment of a process used in the FIG. 5 embodiment.

To calculate the partial modular exponents in the steps E302 and E304 the algorithm shown in FIG. 7 is used (which uses the teaching of the algorithm described with reference to FIG. 2 in patent application WO 2006/103341).

This algorithm not only provides the result of the modular exponentiation (which here is partial), that is to say $m^{d_p} \bmod p$ ($a_1$ in the FIG. 7 algorithm) but also a data word for verifying correct execution of the algorithm, which here has the value $m^{d_p - 1} \bmod p$ (denoted $a_0$ in the FIG. 7 algorithm).

Following execution of this partial modular exponentiation algorithm, the result $m^{d_p} \bmod p$ of the modular exponentiation is stored (still in the step E203 in FIG. 5) in the random access memory 60 as a variable $S_p$.

The verification data word $m^{d_p - 1} \bmod p$ is multiplied by m, after which a CRC algorithm is applied to the result of this multiplication to obtain a compressed data word $CRC_1$ that is stored in the random access memory 60.

Note that it is not necessary at this stage to store any longer in the random access memory 60 the verification data word $m^{d_p - 1} \bmod p$ used previously.

There follows in the step E304 partial modular exponentiation using the algorithm already referred to and described with reference to FIG. 7, this time using the values m, $d_q$ and q to obtain values $M^{d_q} \bmod q$ ($a_1$) and $m^{d_p - 1} \bmod q$ ($a_0$) that are stored in the random access memory 60 as $S_q$ and $S'_q$, respectively.

The recombination of the partial modular results $S_p$ and $S_q$ is then begun by storing in the random access memory 60 under the name TEMP the result of the following calculation: $\{[(S_q - S_p) \bmod q] * a \bmod q\} * p$ (step E306).

There follows a step E308 in which the value $[m * S'_q - (TEMP \bmod q) \bmod q]$ is first calculated, to which the CRC algorithm previously used in the step E302 is then applied, after which it is finally checked if the result obtained in this way is equal to the value $CRC_1$ stored in the random access memory 60 in the step E302 (which naturally entails reading this value in the random access memory).

By virtue of the definition of a as the modular inverse of p modulo q:

$$\{[(S_q - S_p) \bmod q] * a \bmod q\} * p \bmod q = (S_q - S_p) \bmod q.$$

Consequently, by subtracting the two terms of this condition of equality from $S_q$:

$$S_q - \{[(S_q - S_p) \bmod q] * a \bmod q\} * p \bmod q = S_p \bmod q.$$

Now, according to the standard hypothesis used in the definition of the CRT algorithm, $q > p$ (and $p > S_p$), $S_p \bmod q = S_p$.

Consequently, it is usually the case that:

$$(S_q - \{[(S_q - S_p) \bmod q] * a \bmod q\} * p \bmod q) \bmod q = S_p.$$

Here this condition of equality is used to verify that the device is operating without errors by replacing therein $S_q$ by $m \cdot S'_q$ and $S_p$ by $m \cdot m^{d_p - 1} \bmod p$ (and further by comparing the values after compression, bearing in mind that $CRC_1$ is obtained by compressing $m \cdot m^{d_p - 1} \bmod p$).

Thus during execution without errors of the various algorithms referred to above, the verification of equality in the step E308 must yield a positive result and in this case there therefore follows the step E312 in which, if the value TEMP is different from the value S, $S_p$ is added to the value TEMP, after which the set modulo p·q is reduced, which yields the required value S (S=$m^d$ mod p·q), which can therefore be sent to the output to the exterior device, for example via the interface 30. Verifying the condition TEMP≠S protects against attacks by generating errors the objective of which is to block the operation "+$S_p$ mod (p*q)".

On the other hand, if the result of the verification in the step E308 is negative, there follows the step E310 indicating than an error has been detected and that the data processing device can therefore not return any value, in particular to combat attacks by generating errors.

Figure 6:
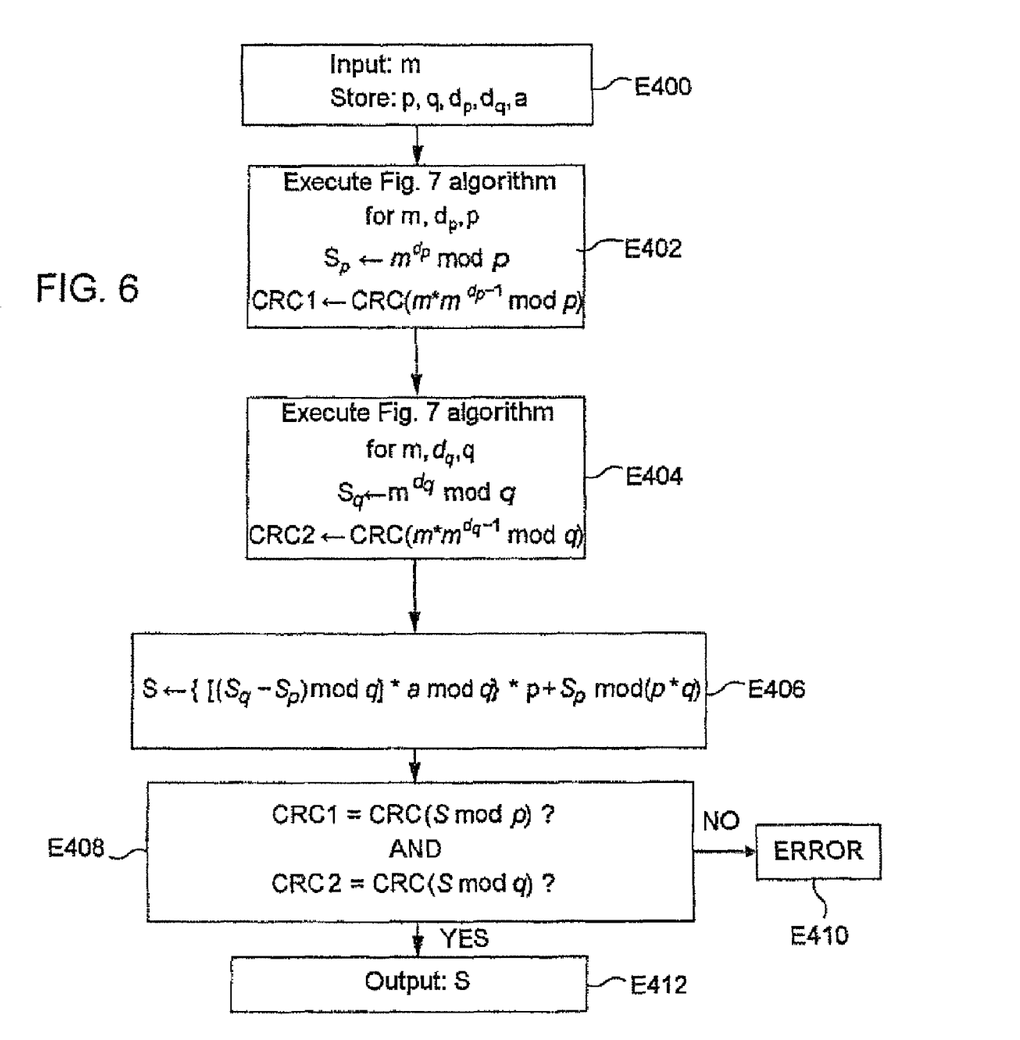
FIG. 6 finally represents a fourth embodiment of the invention.

FIG. 6 represents a fourth embodiment of the invention, which can be seen as a variant of the FIG. 5 embodiment.

At the beginning of this process (step E400), there is therefore received, as in the FIG. 5 process, the value of the message m to which the RSA algorithm is to be applied and there are held in memory the moduli p and q of the private key as well as the remainders $d_p$ and $d_q$ of the secret key d modulo p and q, respectively.

There follows in the step E402 a first partial modular exponentiation using the FIG. 7 algorithm and the values m, $d_p$, p and, as in the previous embodiment, there is stored at a memory location $S_p$ the result $m^d_p$ of the modular exponentiation and at a memory location CRC1 the result of applying a compression algorithm to the product of the message m by the verification data word $a_0$ (the latter data word having the value $m^{d_p-1}$ mod p).

The same procedure is used for the partial modular exponentiation relating to q in the step E404: the result $a_1$ of the FIG. 7 algorithm using the values m, $d_q$ and q is stored as $S_q$. The result of applying the compression algorithm used in the step E402, applied this time to the product of the message m by the verification data word $a_0$ obtained on the new execution of the FIG. 7 algorithm (and which in this case normally has the value $m^{d_p-1}$ mod q), is stored as CRC2.

There follows in the step E406 recombination of the partial modular results $S_p$ and $S_q$ by means of the following formula, the result of which is stored as the output value S:

$$\{[S_q-S_p) \bmod q]*a \bmod q\}*p+S_p \bmod(p*Q)$$

However, before sending this data word S to the output, the following two conditions are verified: CRC1=CRC (S mod p) and CRC2=CRC (S mod q).

If no error has occurred, the above two conditions are satisfied and the value S can be sent to the output in the step E412.

On the other hand, if an error has occurred either during one of the executions of the FIG. 7 algorithm aimed at effecting these modular exponentiations or during the recombination in the step E406 (which could be caused by an attack by generating errors) at least one of the conditions of the step E408 is not satisfied; if either of the conditions of the step E408 is not satisfied, there follows a step E410 in which an error is detected and operation of the processing device is disabled, for example (which prevents sending of the output data word S to the outside of the device).

The algorithm used for the modular exponentiations is described next with reference to FIG. 7.

It begins in the step E500 with reception by the subroutine described here of the values m, d and n.

In consideration of these values, there follows an initialization step E502 during which a variable $a_0$ is initialized to m, a variable $a_1$ is initialized to $m^2$ mod n, and a variable i is initialized to the value k−1 that represents the number of bits of the secret key d (k is a fixed data word of the cryptographic system used) d is also decremented by one unit because of the embodiment used here for the modular exponentiation calculation.

Next is a loop for calculating the modular exponentiation as such, starting with a step E504 of testing the value of the bit $d_i$, writing d in binary form ($d_k, \ldots, d_1$).

Each bit $d_i$ therefore constitutes a bit of the corresponding number with in particular $d_1$ being the least significant bit and $d_k$ the most significant bit.

Thus d=$\Sigma d_i \cdot 2^{i-1}$.

If the bit of rank i in the key d has the value 1, there follows the step E506 in which the variable $a_0$ is first multiplied by the variable $a_1$ (i.e. $a_0*a_1$ mod n is calculated), the result of which is overwritten in the variable $a_0$. There is also calculated in the step E506 the value $a_1^2$ mod n and the variable $a_1$ is updated by the result of this calculation.

If it is determined in the step E504 that the bit of rank i of the secret key d has the value 0 (i.e. if $d_i$=0), there follows the step E508 during which the product of the variable $a_1$ by the variable $a_0$ is calculated (i.e. $a_1*a_0$ mod n is calculated), the value obtained is overwritten in $a_1$, the modular square of the variable $a_0$ is calculated (i.e. the value $a_0^2$ mod n) and the result of this last operation is overwritten in the variable $a_0$.

Note that the steps E506 and E505, respectively executed when the bit of the secret key d concerned in the iteration i has the value 1 or 0, are totally symmetrical with respect to the variables $a_0$ and $a_1$, one of these variables being updated in each case by multiplication by the other variable.

Whatever the result of the test in the step E504, after the step E506 or E508 there follows the step E514 in which the variable i is decremented.

The step E516 then tests if the variable i has reached 0. If not, not all bits of the secret key d have been processed and there follows the next iteration of the loop by returning to the step E504 already described. If so, all the bits of the secret key have been processed and the modular exponentiation calculation has therefore ended: the variable $a_1$ corresponds to the required result, i.e. $m^d$ mod n, and the variable $a_0$ contains a verification data word normally such that m×$a_0$=$a_1$. Exiting the subroutine described here in the step E518 produces the values $a_0$ and $a_1$.

The above embodiments are merely examples of implementation of the invention, which is not limited to them.

The invention claimed is:

1. A data processing method, comprising the following steps:
   determining a first result data word from a first input data word and a first secret data word by applying a partial modular exponentiation algorithm, wherein the partial modular exponentiation algorithm produces a data word representing a first partial modular exponentiation result;
   obtaining a first compressed data word from the first result data word using a compression algorithm;
   applying anew the partial modular exponentiation algorithm, using a second secret data word, to produce a data word representing a second partial modular exponentiation result;
   determining a second result data word by a calculation including recombination of the first and second partial modular exponentiation results;
   obtaining a second compressed data word from the second result data word using the compression algorithm; and comparing the first compressed data word and the second compressed data word, wherein, if the first compressed data word is different from the second compressed data word, error is detected in the processing of the first input data word;

wherein the aforesaid steps are performed by a data processing device.

2. The method according to claim 1, wherein the first result data word is obtained on the basis of a verification data word linked to a data word representing a modular exponentiation result, and the first compressed data word is obtained by compressing the first result data word.

3. The method according to claim 2, wherein during modular exponentiation, a particular operation is selectively applied to the verification data word or to the data word representing the modular exponentiation result according to the value of a bit of the first secret data word.

4. The method according to claim 1, wherein the first secret data word and the second secret data word are each obtained from a cryptography key.

5. The method according to claim 1, wherein the compression algorithm uses a function that cannot be inverted.

6. The method according to claim 5, wherein the compression algorithm is of CRC type.

7. The method according to claim 5, wherein the compression algorithm includes summation of words of a predetermined number of bits modulo the number two to the power of that particular number.

8. The method according to claim 5, wherein the compression algorithm includes applying an exclusive-OR operation to words of a predetermined number of bits.

9. The method according to claim 1, wherein a step of storing the first compressed data word before the step of obtaining the second result data word.

10. The method according to claim 9, wherein the step of storing is executed in random access memory.

11. The method according to claim 1, wherein a step of storing the second compressed data word before the comparison step.

12. The method according to claim 1, wherein the first compressed data word is stored in an internal register of a microprocessor.

13. The method according to claim 1, wherein the second compressed data word is obtained from the second result data word using a verification data word produced by applying the partial modular exponentiation algorithm using said second secret data word.

14. The method according to claim 13, wherein the second compressed data word is obtained from the second result data word by applying a first modulo operation and by applying the compression algorithm.

15. The method according to claim 14, further comprising the following steps:
obtaining a third compressed data from the second result data word by applying a second modulo operation and by applying the compression algorithm;
obtaining a fourth compressed data using the compression algorithm and a verification data produced by applying the partial modular exponentiation algorithm using said second secret data word; and
comparing the third compressed data and the fourth compressed data.

16. A data processing device, comprising:
means for determining a first result data word from a first input data word and a first secret data word by applying a partial modular exponentiation algorithm, wherein the partial modular exponentiation algorithm produces a data word representing a first partial modular exponentiation result;
means for obtaining a first compressed data word from the first result data word using a compression algorithm;
means for applying anew the partial modular exponentiation algorithm, using a second secret data word, to produce a data word representing a second partial modular exponentiation result;
means for determining a second result data word by a calculation including recombination of the first and second partial modular exponentiation results;
means for obtaining a second compressed data word from the second result data word using the compression algorithm; and
means for comparing the first compressed data word and the second compressed data word, wherein, if the first compressed data word is different from the second compressed data word, error is detected in the processing of the first input data word.

17. The data processing device according to claim 16, wherein the data processing device includes means for storing the first compressed data word.

18. The data processing device according to claim 16, wherein the first secret data word and the second secret data word are each obtained from a cryptography key.

19. The data processing device according to claim 16, wherein the compression algorithm uses a function that cannot be inverted.

20. The data processing device according to claim 16, wherein the data processing device is a pocket electronic entity.

21. The data processing device according to claim 16, wherein the data processing device is a microcircuit card.

* * * * *